US012610431B2

(12) United States Patent
Lu

(10) Patent No.: US 12,610,431 B2
(45) Date of Patent: Apr. 21, 2026

(54) WIRELESS COMMUNICATION METHOD, COMMUNICATION DEVICE, CHIP, AND COMMUNICATION SYSTEM

(71) Applicant: GUANGDONG OPPO MOBILE TELECOMMUNICATIONS CORP., LTD., Dongguan (CN)

(72) Inventor: Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/154,877

(22) Filed: Jan. 21, 2021

(65) Prior Publication Data

US 2021/0144801 A1 May 13, 2021

Related U.S. Application Data

(63) Continuation of application No. PCT/CN2018/113727, filed on Nov. 2, 2018.

(30) Foreign Application Priority Data

| | | |
|---|---|---|
| Aug. 7, 2018 | (WO) | PCT/CN2018/099194 |
| Sep. 20, 2018 | (WO) | PCT/CN2018/106763 |
| Sep. 30, 2018 | (WO) | PCT/CN2018/109200 |

(51) Int. Cl.
*H04W 80/02* (2009.01)
*H04L 47/34* (2022.01)
(Continued)

(52) U.S. Cl.
CPC ............. *H04W 80/02* (2013.01); *H04L 47/34* (2013.01); *H04W 28/06* (2013.01); *H04W 36/02* (2013.01); *H04W 76/27* (2018.02)

(58) Field of Classification Search
CPC ..... H04W 76/15; H04W 28/06; H04W 36/02; H04W 80/02; H04W 36/18; H04W 36/0069; H04L 47/34
See application file for complete search history.

(56) References Cited

U.S. PATENT DOCUMENTS

| | | | |
|---|---|---|---|
| 2016/0057585 A1* | 2/2016 | Horn ..................... | H04W 40/02 370/312 |
| 2016/0065700 A1 | 3/2016 | Yi et al. | |

(Continued)

FOREIGN PATENT DOCUMENTS

| | | |
|---|---|---|
| CN | 105230073 A | 1/2016 |
| CN | 106357548 A | 1/2017 |

(Continued)

OTHER PUBLICATIONS

Guangdong OPPO Mobile Telecommunications Corp. Ltd., International Search Report and Written Opinion, PCT/CN2018/099194, May 7, 2019, 14 pgs.
Guangdong OPPO Mobile Telecommunications Corp. Ltd., International Search Report and Written Opinion, PCT/CN2018/109200, May 7, 2019, 12 pgs.

(Continued)

*Primary Examiner* — Mandish K Randhawa
(74) *Attorney, Agent, or Firm* — Morgan, Lewis & Bockius LLP

(57) ABSTRACT

A wireless communication method, applied to a communication device including at least two packet data convergence protocol (PDCP) entities, the at least two PDCP entities are used for serving identical upper layer data and the method includes: the communication device receives and/or transmits data by means of the at least two PDCP entities.

8 Claims, 6 Drawing Sheets

200

Perform, by the communication device, data transmission through the at least two PDCP entities ——210

Exchange, by the communication device, a sending condition of PDCP PDU between sending entities of the at least two PDCP entities ——220

Exchange, by the communication device, a receiving condition of PDCP PDU between receiving entities of the at least two PDCP entities ——230

(51) Int. Cl.
_H04W 28/06_ (2009.01)
_H04W 36/02_ (2009.01)
_H04W 76/27_ (2018.01)

(56) References Cited

U.S. PATENT DOCUMENTS

| | | | | | |
|---|---|---|---|---|---|
| 2018/0367288 | A1* | 12/2018 | Vrzic | ................... | H04W 36/22 |
| 2019/0053073 | A1* | 2/2019 | Hayashi | ............... | H04W 36/02 |

FOREIGN PATENT DOCUMENTS

| | | |
|---|---|---|
| CN | 107439037 A | 12/2017 |
| CN | 107852768 A | 3/2018 |
| CN | 108347727 A | 7/2018 |
| GB | 2572631 A | 10/2019 |
| GB | 201805718 | 10/2019 |
| JP | 2017529762 A | 10/2017 |
| WO | WO2014110810 A1 | 7/2014 |
| WO | WO2018063435 A2 | 4/2018 |
| WO | WO2018121643 A1 | 7/2018 |
| WO | WO2020/029074 A1 | 2/2020 |
| WO | WO2020/029414 A1 | 2/2020 |
| WO | WO2020/029445 A1 | 2/2020 |

OTHER PUBLICATIONS

Guangdong OPPO Mobile Telecommunications Corp. Ltd., International Search Report and Written Opinion, PCT/CN2018/113727, May 7, 2019, 12 pgs.
Guangdong OPPO Mobile Telecommunications Corp. Ltd., Extended European Search Report, EP18929409.3, Jul. 28, 2021, 9 pgs.
3GPP TR 36.842 v12.0.0, (Dec. 2013) 3rd Generation Partnership Project; Technical Specification Group Radio Access Network; Study on Small Cell enhancements for E-UTRA and E-UTRAN; Higher layer aspects, Release 12, 71 pgs.
3GPP TS 38.323 V15.2.0, (Jun. 2018), 3rd Generation Partnership Project; Technical Specification Group radio Access Network; NR; Packet Data Convergence Protocol (PDCP) specification, Release 15, 26 pgs.
3GPP TS 37.340 V15.2.0, (Jun. 2018), 3rd Generation Partnership Project; Technical Specification Group Radio Access Network; Evolved Universal Terrestrial Radio Access (E-UTRA) and NR; Multi-connectivity; Stage 2, Release 15, 55 pgs.
Examination Report, IN202127008808, Jan. 21, 2022, 7 pgs.
Guangdong OPPO Mobile Telecommunications Corp. Ltd., First Office Action, CN202110374219.8, Jul. 19, 2022, 20 pgs.
Notice of Reasons for Refusal, JP2021-505842, Jul. 22, 2022, 5 pgs.
Guangdong OPPO Mobile Telecommunications Corp. Ltd., Office Action/Search Report, IN202127008808, Dec. 21, 2023, 2 pgs.

* cited by examiner

<u>100</u>

130

110

120

120

WIRELESS COMMUNICATION METHOD, COMMUNICATION DEVICE, CHIP, AND COMMUNICATION SYSTEM

CROSS-REFERENCE TO RELATED APPLICATION

This application is a continuation application of PCT Application No. PCT/CN2018/113727, filed Nov. 2, 2018, which claims priority to PCT Application No. PCT/CN2018/099194, filed Aug. 7, 2018; PCT Application No. PCT/CN2018/106763, filed Sep. 20, 2018; and PCT Application No. PCT/CN2018/109200, filed Sep. 30, 2018, all of which are incorporated herein by reference.

TECHNICAL FIELD

Embodiments of the disclosure relate to the field of communications, and more particularly, to a wireless communication method, a communication device, a chip, and a communication system.

BACKGROUND

At present, in the discussion of NR, data duplication transmission based on PDCP duplication has been proposed to improve the reliability of data transmission. NR currently defines two protocol architectures to support data duplication transmission, including data duplication transmission of carrier aggregation (CA) and data duplication transmission of dual connectivity (DC). However, the above two protocol architectures are data duplication transmission based on a single PDCP entity. Therefore, when a user equipment (UE) moves from a first access network device to a second access network device, it needs to undergo changes in the security key, while one PDCP entity can only use one security key at a time. In other words, during a network handover for data duplication transmission, a change in the security key causes the UE to perform a PDCP re-establishment operation to reconfigure the security key, and further causes a service interruption of the PDCP entity.

Therefore, with respect to the network handover for data duplication transmission, it is an urgent problem in the art to avoid service interruption of the PDCP entity, thereby improving data transmission efficiency.

SUMMARY

There are provided a wireless communication method, a communication device, a chip, and a communication system, which can avoid service interruption of the PDCP entity, thereby improving data transmission efficiency.

According to a first aspect, there is provided a wireless communication method, applied to a communication device configured with at least two packet data convergence protocol (PDCP) entities, the at least two PDCP entities providing service for same upper-layer data, and the method including: receiving and/or sending, by the communication device, data through the at least two PDCP entities.

Optionally, the upper-layer data includes data in one or more quality of service (QoS) flows.

Optionally, the upper-layer data includes data in one or more evolved packet system (EPS) bearers.

Optionally, each of the at least two PDCP entities is configured with a respective key.

Optionally, a PDCP entity of the at least two PDCP entities is provided with a data duplication function.

Optionally, a PDCP entity of the at least two PDCP entities is provided with a redundancy detection function.

Optionally, the communication device is further configured with at least one service data adaptation protocol (SDAP) entity; wherein, said receiving and/or sending, by the communication device, data through the at least two PDCP entities includes: receiving and/or sending, by the communication device, data through the at least two PDCP entities and at least one SDAP entity corresponding to the at least two PDCP entities.

Optionally, a SDAP entity in the at least one SDAP entity is provided with a data duplication function.

Optionally, a SDAP entity in the at least one SDAP entity is provided with a redundancy detection function.

Optionally, a SDAP PDU generated by the SDAP entity in the at least one SDAP entity includes a sequence number (SN) of the SDAP PDU.

Optionally, the at least one SDAP entity and the at least two PDCP entities are in one-to-one correspondence.

Optionally, the at least one SDAP entity includes only one SDAP entity.

Optionally, any one of the at least two PDCP entities includes a sending entity and a receiving entity.

Optionally, at least two PDCP receiving entities independently perform an encryption function and/or a decryption function.

Optionally, at least two PDCP receiving entities independently perform a compression function and/or a decompression function.

Optionally, a PDCP entity of the at least two PDCP entities performs redundancy detection based on a sequence number (SN) and/or a hyper frame number (HFN) and/or a count value of a PDCP protocol data unit PDU.

Optionally, the redundancy detection is performed after decryption is completed.

Optionally, the redundancy detection is performed after decompression is completed.

Optionally, PDCP entities of the at least two PDCP entities perform reordering based on a sequence number (SN) and/or a hyper frame number (HFN) and/or a count value of a PDCP protocol data unit PDU.

Optionally, the reordering is performed after decryption is completed.

Optionally, the reordering is performed after decompression is completed.

Optionally, the method further includes: forwarding, by the communication device, PDCP-processed data to a first device.

Optionally, the PDCP processing includes decryption.

Optionally, the PDCP processing includes decompression.

Optionally, the communication device is a source end in a handover process, and the first device is a target end in the handover process.

Optionally, the communication device is a target end in a handover process, and the first device is a source end in the handover process.

Optionally, the first device is provided with a redundancy detection function and a reordering function.

Optionally, said forwarding, by the communication device, PDCP-processed data to the first device includes: forwarding, by the communication device, the PDCP-processed data to the first device together with at least one of: a sequence number (SN), a hyper frame number (HFN), or a count value of a PDCP PDU.

Optionally, said forwarding, by the communication device, PDCP-processed data to the first device includes:

forwarding, by the communication device when a certain condition is satisfied, the PDCP-processed data to the first device.

Optionally, the certain condition includes: the communication device receives or has received radio resource control (RRC) connection completion information.

Optionally, the at least two PDCP entities are a first PDCP entity and a second PDCP entity.

Optionally, the first PDCP entity and the second PDCP entity are established at the same time.

Optionally, the second PDCP entity has been established, and the first PDCP entity is established based on the second PDCP entity.

Optionally, the first PDCP entity is a first PDCP receiving entity, the second PDCP entity is a second PDCP receiving entity, and the first PDCP receiving entity is established based on the second PDCP receiving entity.

Optionally, variables initialization of the first PDCP receiving entity is performed based on a sequence number (SN) and/or a hyper frame number (HFN) and/or a count value of at least one of following data units of the second PDCP receiving entity:

a first missing PDCP service data unit (SDU), a next PDCP SDU to be received, a first PDCP SDU indicative of waiting to be delivered to an upper layer, or a PDCP protocol data unit (PDU) used for triggering a reordering timer.

Optionally, variables initialization of the first PDCP receiving entity is performed based on a sequence number (SN) and/or a hyper frame number (HFN) and/or a count value of an out-of-order data packet that the second PDCP receiving entity has received.

Optionally, the first PDCP entity is a first PDCP sending entity, the second PDCP entity is a second PDCP sending entity, and the first PDCP sending entity is established based on the second PDCP sending entity.

Optionally, variables initialization of the first PDCP sending entity is performed based on a sequence number (SN) and/or a hyper frame number (HFN) and/or a count value of a next PDCP PDU to be allocated by the second PDCP sending entity, or a maximum SN and/or a maximum HFN and/or a maximum count value of a PDCP PDU that has been sent by the second PDCP sending entity.

Optionally, the second PDCP entity is established through a network configuration.

Optionally, the network configuration includes at least one of: whether to configure a data duplication function, whether to activate the data duplication function, and whether to send data using the first PDCP entity or the second PDCP entity.

Optionally, the method further includes: exchanging, by the communication device, sending condition of a PDCP PDU between sending entities of the at least two PDCP entities.

Optionally, the sending condition of the PDCP PDU includes a sequence number (SN) and/or a hyper frame number (HFN) and/or a count value of the PDCP PDU that has been sent.

Optionally, the sending condition of the PDCP PDU further includes a maximum SN and/or a maximum HFN and/or a maximum count value of the PDCP PDU that has been sent.

Optionally, the method further comprises: exchanging, by the communication device, receiving condition of a PDCP PDU between receiving entities of the at least two PDCP entities.

Optionally, the receiving condition of the PDCP PDU includes a sequence number (SN) and/or a hyper frame number (HFN) and/or a count value of the PDCP PDU that has been received.

Optionally, the receiving condition of the PDCP PDU includes a data forwarding condition of a decrypted data packet.

Optionally, the receiving condition of the PDCP PDU further includes a count value indicative of a next PDCP SDU to be received, a count value indicative of a first PDCP SDU waiting to be delivered to an upper layer, or a count value of a PDCP PDU used for triggering a reordering timer increased by one.

According to a second aspect, there is provided a communication device configured to perform the method according to the first aspect and any possible implementation manner thereof as described above.

Optionally, the communication device includes a communication module configured to perform the method according to the first aspect and any possible implementation manner thereof as described above.

According to a third aspect, there is provided a communication device, including a processor configured to call and run a computer program from a memory, wherein the computer program is used for implementing the method according to the first aspect and any possible implementation manner thereof as described above.

Optionally, the communication device further includes: a memory configured to store the computer program.

According to a fourth aspect, there is provided a chip configured to perform the method according to the first aspect or any possible implementation manner thereof as described above.

Optionally, the chip includes: a processor, configured to call and run a computer program from a memory, wherein the computer program is used for implementing the method according to the first aspect and any possible implementation manner thereof as described above.

Optionally, the chip further includes: a memory configured to store the computer program.

According to a fifth aspect, there is provided a computer-readable storage medium, being used for storing a computer program used for implementing the method according to the first aspect or any possible implementation manner thereof as described above.

According to a sixth aspect, there is provided a computer program product, including computer program instructions used for implementing the method according to the first aspect or any possible implementation manner thereof as described above.

According to a seventh aspect, there is provided a computer program product, when being executed on a computer, caucusing the computer to perform the method according to the first aspect or any possible implementation manner thereof as described above.

According to an eighth aspect, there is provided a communication system including the communication device according to the second aspect as described above.

Based on the above technical solution, the communication device provides service for the same upper-layer data through at least two PDCP entities, so as to avoid service interruption of the PDCP entity, thereby improving data transmission efficiency.

DETAILED DESCRIPTION

Figure 1:
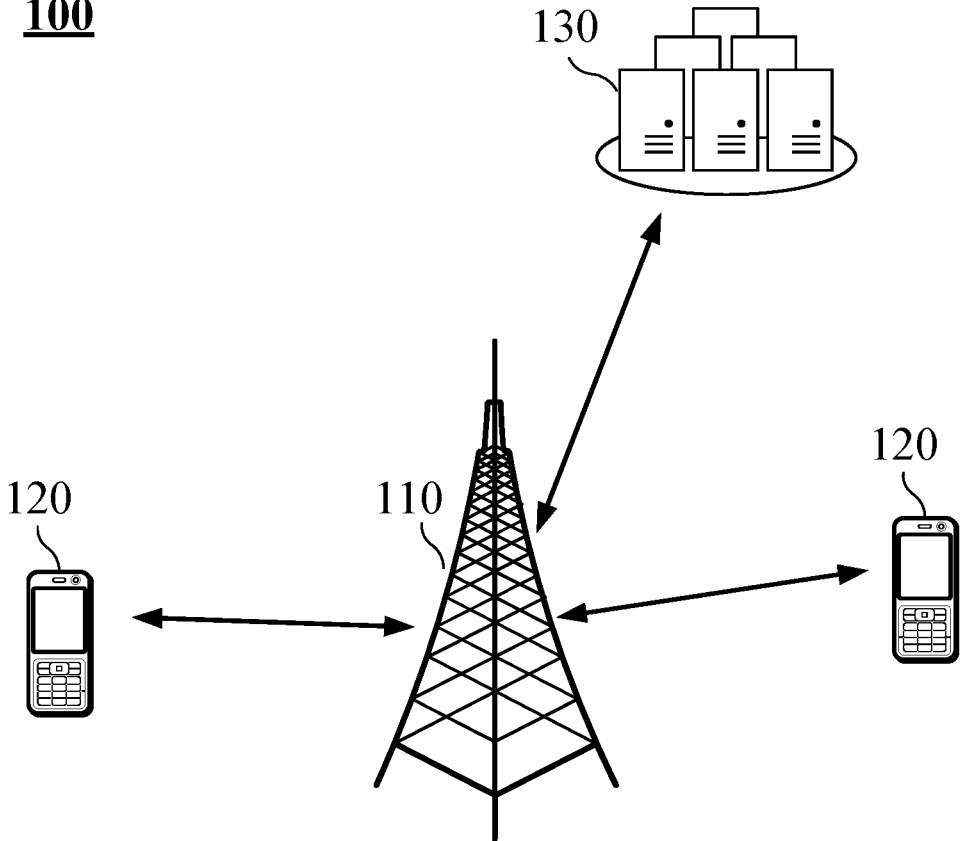
FIG. 1 illustrates an example of a wireless communication system according to an embodiment of the present application.

FIG. 1 illustrates a wireless communication system 100 applied in an embodiment of the present application. The wireless communication system 100 may include a base station 110 and at least one terminal device 120 located within a coverage area of the base station 110.

The base station 110 may be a device that communicates with the terminal device. The base station 110 may provide communication coverage for a specific geographic area, and may communicate with a terminal device (e.g., a UE) located within the coverage area. Optionally, the base station 110 may be a base station (gNB) in an NR system, or a wireless controller in a Cloud Radio Access Network (CRAN). Optionally, the network device may be a relay station, an access point, vehicle-mounted equipment, wearable equipment, or network equipment in a future-evolved public land mobile network (PLMN). The terminal device 120 may be mobile or fixed. Optionally, the terminal device 120 may refer to an access terminal, user equipment (UE), user unit, user station, mobile station, mobile site, remote station, remote terminal, mobile device, user terminal, terminal, wireless communication device, user agent, or user device. The access terminal may be a cellular phone, a cordless phone, a Session Initiation Protocol (SIP) phone, a Wireless Local Loop (WLL) station, a Personal Digital Processing (PDA), a handheld device with wireless communication function, a computing device, or other processing devices connected to a wireless modem, in-vehicle devices, wearable devices, terminal devices in future 5G networks, or terminal devices in future evolved PLMN. The wireless communication system 100 may further include a core network device 130 that communicates with the base station. The core network device 130 may be a 5G core network (5G Core, 5GC) device, for example, an Access and Mobility Management Function (AMF), an Authentication Server Function (AUSF), a User Plane Function (UPF), or a Session Management Function (SMF). Optionally, the core network device 130 may also be an Evolved Packet Core (EPC) device of the LTE network, for example, a Session Management Function and Core Packet Gateway (SMF+

PGW-C) device. It should be understood that the SMF+ PGW-C device can simultaneously achieve the functions of the SMF and the PGW-C.

Figure 2:
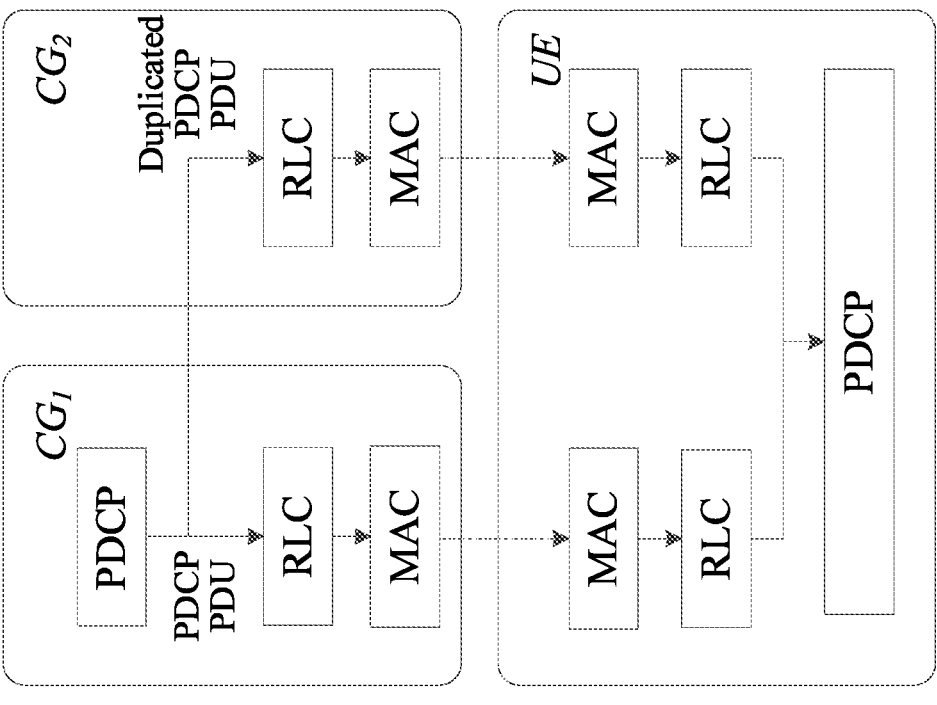
FIG. 2 illustrates an example of a protocol architecture for downlink transmission in DC scenario according to an embodiment of the present application.

Optionally, each functional unit in the communication system 100 may establish a connection through a next generation network (NG) interface to implement communication. For example, the terminal device establishes an air interface connection with an access network device through an NR interface for transmitting user plane data and control plane signaling; the terminal device may establish a control plane signaling connection with the AMF through an NG interface 1 (referred to as N1); the access network device, such as a next-generation wireless access base station (gNB), can establish a user plane data connection with the UPF through NG interface 3 (referred to as N3); the access network device can establish control plane signaling connection with AMF through NG interface 2 (referred to as N2); UPF can establish control plane signaling connection with SMF through NG interface 4 (referred to as N4); UPF can exchange user plane data with data network through NG interface 6 (referred to as N6); AMF can establish a control plane signaling connection with SMF through NG interface 11 (referred to as N11); SMF can establish a control plane signaling connection with PCF through NG interface 7 (referred to as N7). It should be noted that the part shown in FIG. 2 is only an exemplary architecture diagram. In addition to the functional units shown in FIG. 1, the network architecture may also include other functional units or functional entities. For example, the core network device may also include other functional units such as unified data management (UDM), which are not specifically limited in the embodiments of the present application.

FIG. 1 exemplarily illustrates a base station, a core network device, and two terminal devices. Optionally, the wireless communication system 100 may include multiple base station devices and each base station may include other numbers of terminal devices in its coverage area, the embodiments of the present application are not limited thereto.

Figure 3:
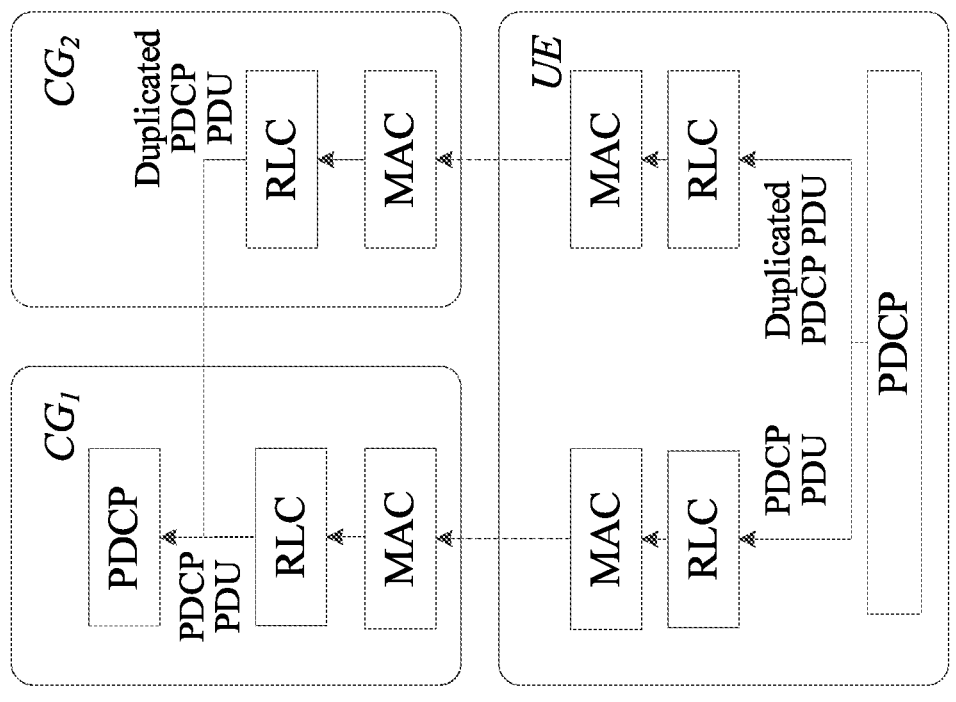
FIG. 3 illustrates an example of a protocol architecture for uplink transmission in DC scenario according to an embodiment of the present application.

In a dual connection (DC) scenario, multiple communication devices, for example, Cell Groups (CGs), can provide service for terminal devices, and duplicated data can be transmitted between the cell group and the terminal devices. Optionally, the CG may be equivalent to a communication device, a network device, or the like. As shown in FIGS. 2 and 3, the duplicated data transmission manner in the DC scenario adopts a split bearer protocol architecture. For uplink and downlink, Packet Data Convergence Protocol (PDCP) is located in a certain CG (master CG (MCG) or secondary CG (SCG)), and this CG is an "anchor" CG (anchor CG). PDCP duplicates a PDCP protocol data unit (PDU) into two identical ones, such as a PDCP PDU and a duplicated PDCP PDU. The two PDCP PDUs go through radio link control (RLC) layers and media access control (MAC) layers of different CGs, arrives at corresponding MAC and RLC layers of a terminal (downlink) or a base station (uplink) through the air interface, and finally converge to PDCP. The PDCP layer detects that the two PDCP PDUs are the same duplicated copies, discards one of them and deliver the other to an upper layer. In addition, in the embodiments of the present application, the two bearers respectively connected to RLC and MAC under PDCP are referred to as split bearers. If the PDCP is located at the MCG, it is MCG Split Bearer. If the PDCP is located at the SCG, it is SCG Split Bearer. In the embodiments of the present application, two PDCP PDUs are transmitted through different CGs, which can achieve the purpose of frequency diversity gain, and further improve the reliability of data transmission. It can be found that, in the architectures shown in FIGS. 3 to 4, data duplication transmission is performed based on a single PDCP entity. However, in the above two protocol architectures, data duplication transmission is performed based on the single PDCP entity. Therefore, when a user equipment (UE) moves from a first access network device to a second access network device, it needs to undergo changes in the security key, while a PDCP entity can only use one security key at a time. In other words, during a network handover for data duplication transmission, a change in the security key causes the UE to perform a PDCP re-establishment operation to reconfigure the security key, and further causes a service interruption of the PDCP entity.

Figures 4, 5:
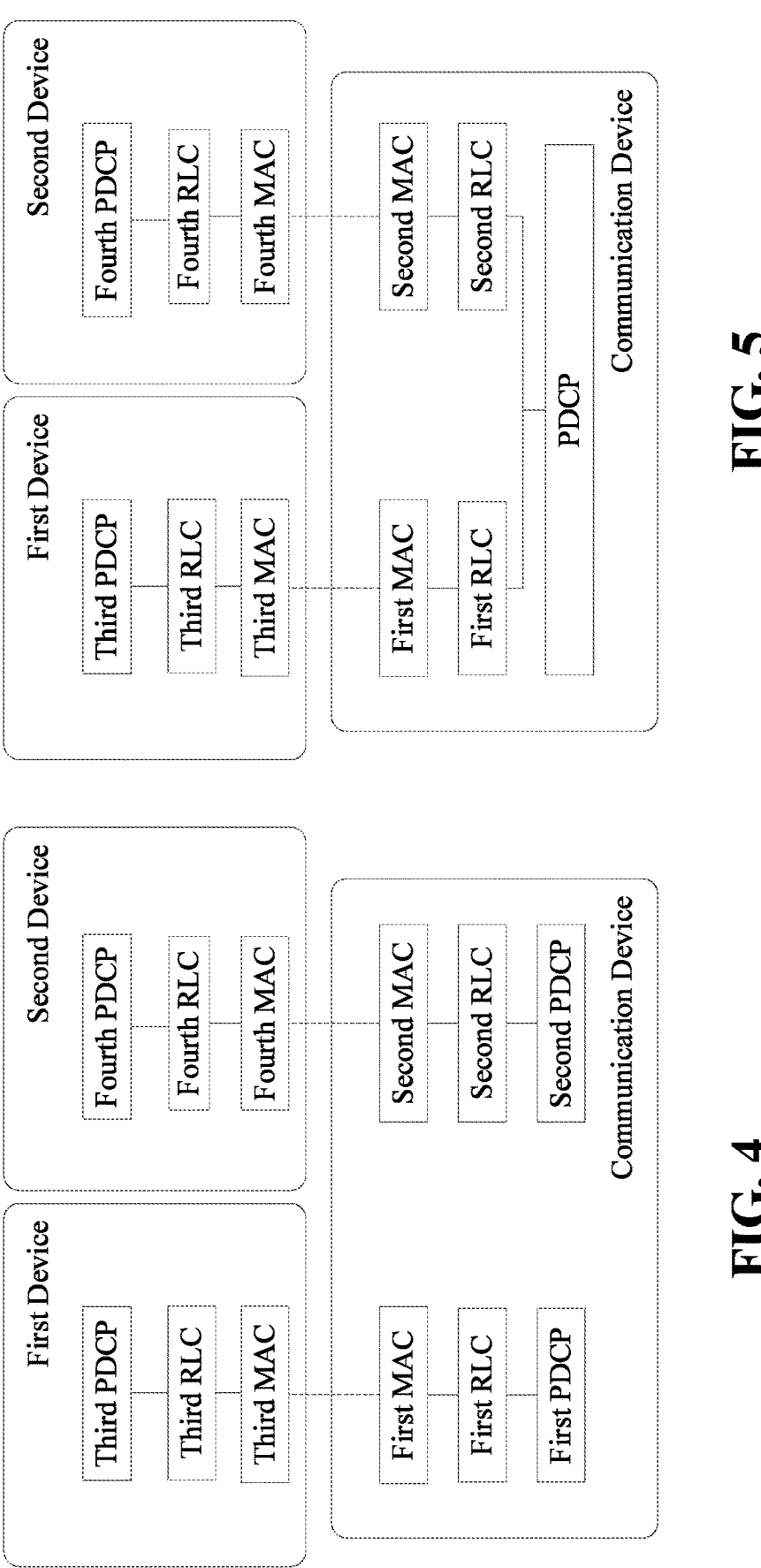
FIG. 4 is a schematic diagram illustrating another protocol architecture of a communication device according to an embodiment of the present application.
FIG. 5 is a schematic diagram illustrating a protocol architecture of a communication device according to an embodiment of the present application.

The application proposes a protocol architecture, which can avoid service interruption of the PDCP entity, thereby improving data transmission efficiency. FIGS. 4 and 5 illustrate schematic block diagrams of the protocol architecture of communication devices according to an embodiment of the present application. It should be understood that the communication device shown in FIGS. 4 and 5 may be the terminal device 120 shown in FIG. 1, the access network device 110 shown in FIG. 1, or the core network device 130 shown in FIG. 1. Correspondingly, the first device or the second device shown in FIGS. 4 and 5 may be the terminal device 120 shown in FIG. 1, or the access network device 110 shown in FIG. 1, or the core network device 130 shown in FIG. 1. It should also be understood that the protocol architecture shown in FIGS. 4 and 5 are only exemplary. However, the embodiments of the present application are not limited thereto. For example, in other alternative embodiments, the communication device may include more than two PDCP entities.

As shown in FIG. 4, the communication device includes a first PDCP entity and a second PDCP entity as shown in FIG. 4.

Specifically, as shown in FIG. 4, the communication device may include a first PDCP entity, a first RLC entity, a first MAC entity, a second PDCP entity, a second RLC entity, and a second MAC entity. The first device includes a third PDCP entity, a third RLC entity, and a third MAC entity. The second device may include a fourth PDCP entity, a fourth RLC entity, and a fourth MAC entity. Specifically, the first PDCP entity of the communication device reaches the third MAC entity, the third RLC entity, and the third PDCP entity of the first device through the first RLC entity, the first MAC entity, and then the air interface. The second PDCP entity of the communication device reaches the fourth MAC entity, the fourth RLC entity, and the fourth PDCP entity of the second device through the second RLC entity, the second MAC entity, and then the air interface.

Optionally, a PDCP PDU generated by the first PDCP entity and a PDCP PDU generated by the second PDCP entity are different data. For example, the first PDCP PDU is completely different from the second PDCP PDU.

Optionally, the PDCP PDU generated by the first PDCP entity is partially same as the PDCP PDU generated by the second PDCP entity. For example, the PDCP PDU generated by the first PDCP entity is duplicated data of the PDCP PDU generated by the second PDCP entity. As another example, the PDCP PDU generated by the second PDCP entity is duplicated data of the PDCP PDU generated by the first PDCP entity.

Optionally, the first PDCP entity and the second PDCP entity are used for serving the same upper-layer data. That is, the communication device may transmit the same upper-layer data through the first PDCP entity and the second PDCP entity. Optionally, the upper-layer data includes data in one or more Quality of Service (QoS) flows. Optionally, the upper-layer data includes data in one or more evolved packet system (EPS) bearers.

It should be noted that the upper-layer data in the embodiment of the present application is not equivalent to the data received by the PDCP entity. For example, the first PDCP entity and the second PDCP entity are used for transmitting the same QoS flow, while specific data packets on the first PDCP entity and the second PDCP entity are different data packets.

Optionally, in the protocol architecture shown in FIG. 4, the first PDCP entity has a private key, and the second PDCP entity may also have a private key.

Optionally, in the protocol architecture shown in FIG. 4, the first PDCP entity has a data duplication function, and/or the second PDCP entity has a data duplication function. For example, taking the first PDCP entity having the data duplication function as an example, the communication device may generate PDCP PDU and duplicated data thereof through the first PDCP entity; the communication device may send duplicated data of the PDCP PDU to the second PDCP entity through the first PDCP entity, and send the PDCP PDU to the first RLC.

Optionally, in the protocol architecture shown in FIG. 4, the first PDCP entity has a redundancy detection function, and/or the second PDCP entity has a redundancy detection function. For example, taking the first PDCP entity having the redundancy detection function as an example, the communication device may receive a data unit sent by the SDAP entity or a data unit sent by the first RLC entity shown in FIG. 4 through the first PDCP entity; and perform redundancy detection on the received data unit.

Optionally, in the protocol architecture shown in FIG. 4, the communication device may further include at least one Service Data Adaptation Protocol (SDAP) entity. That is, the communication device may receive data and/or send data through the at least two PDCP entities and the at least one SDAP entity corresponding to the at least two PDCP entities.

Optionally, a SDAP entity in the at least one SDAP entity has a data duplication function. For example, in the protocol architecture shown in FIG. 4, the communication device may generate a SDAP PDU and duplicated data of the SDAP PDU through the SDAP entity in the at least one SDAP entity; the communication device may send the SDAP PDU to the first PDCP entity, and send the duplicated data of the SDAP PDU to the second PDCP entity. Further, the SDAP PDU and the duplicated data thereof generated by the SDAP entity include a SN of the SDAP PDU, respectively.

Optionally, the SDAP entity in the at least one SDAP entity has a redundancy detection function. For example, in the protocol architecture shown in FIG. 4, the communication device may receive, through the SDAP entity in the at least one SDAP entity, the PDCP PDU sent by the first PDCP entity and the duplicated data of the PDCP PDU sent by the second PDCP entity. Then, the communication device may perform redundancy detection on the PDCP PDU and the duplicated data of the PDCP PDU through the SDAP entity in the at least one SDAP entity. Further, the SDAP PDU generated by the SDAP entity may include a SN of the SDAP PDU.

Optionally, in the protocol architecture shown in FIG. 4, the at least one SDAP entity includes a first SDAP entity and a second SDAP entity, wherein the first SDAP entity corresponds to the first PDCP entity and the second SDAP entity corresponds to the second PDCP entity.

Optionally, in the protocol architecture shown in FIG. 4, the at least one SDAP entity includes only one SDAP entity, which corresponds to the first PDCP entity and the second PDCP entity.

Optionally, in the protocol architecture shown in FIG. 4, the first PDCP entity includes a sending entity and a receiving entity, and/or, the second PDCP entity includes a sending entity and a receiving entity.

Optionally, in the protocol architecture shown in FIG. 4, the sending entity of the first PDCP entity and the sending entity of the second PDCP entity exchange sending condition of the PDCP PDU.

Optionally, the sending condition of the PDCP PDU includes a sequence number SN and/or a hyper frame number HFN and/or a count value COUNT of the PDCP PDU that has been sent.

Optionally, the sending condition of the PDCP PDU further includes a maximum SN and/or a maximum HFN and/or a maximum count value COUNT of the PDCP PDU that has been sent.

Figure 6:
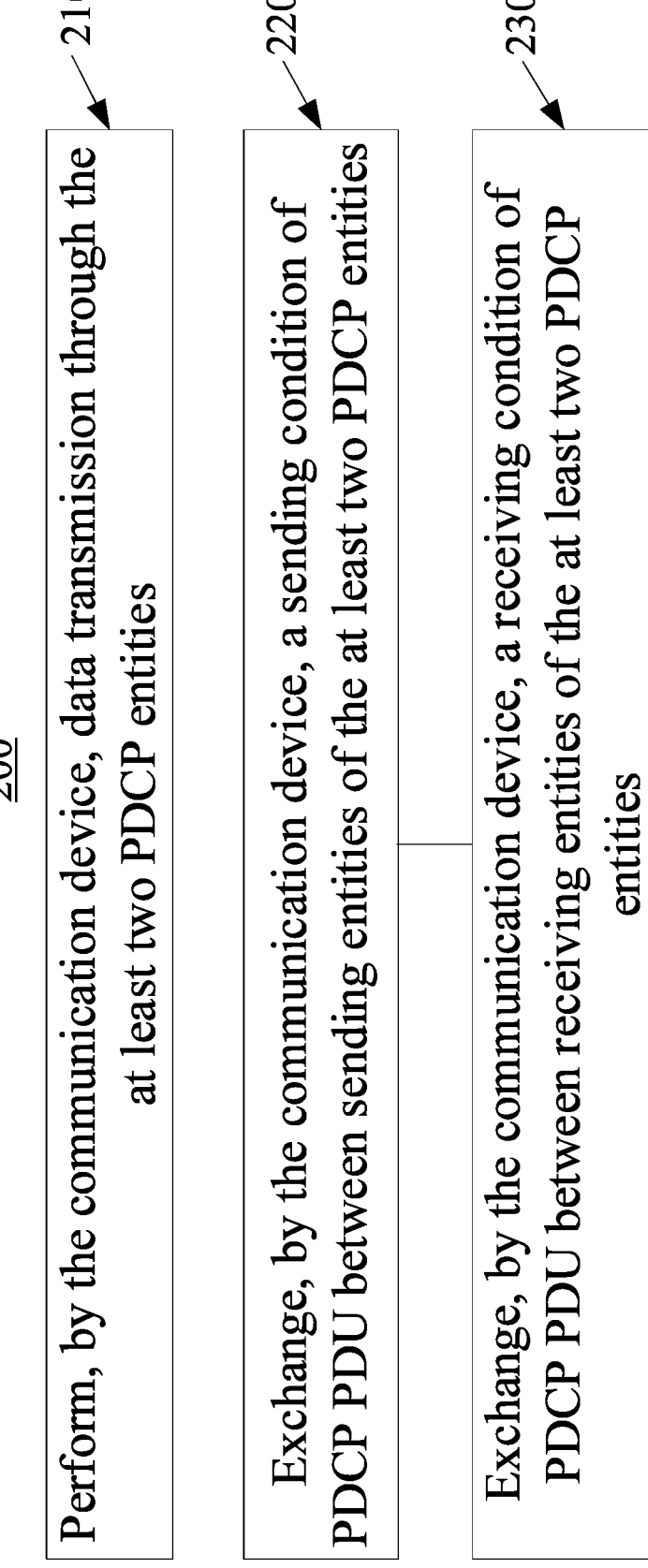
FIG. 6 is a schematic flow chart illustrating a wireless communication method according to an embodiment of the present application.

Optionally, the method shown in FIG. 6 may further include: exchanging receiving condition of the PDCP PDU between the receiving entity of the first PDCP entity and the receiving entity of the second PDCP entity.

Optionally, the receiving condition of the PDCP PDU includes a SN and/or a HFN and/or a count value COUNT of the PDCP PDU that has been received.

Optionally, the receiving condition of the PDCP PDU includes a data forwarding condition of a decrypted data packet.

Optionally, the receiving condition of the PDCP PDU further includes a count value indicative of a next PDCP SDU to be received, a count value indicative of a first PDCP SDU waiting to be delivered to an upper layer, or a count value of a PDCP PDU used for triggering a reordering timer increased by one.

It should be understood that the protocol architecture shown in FIG. 4 is only an example of the present application and should not be construed as limiting the embodiments of the present application. As shown in FIG. 5, the communication device may include only one PDCP. Further, the communication device may further include a PDCP entity, a first RLC entity, a first MAC entity, a second RLC entity, and a second MAC entity. The first device includes a third PDCP entity, a third RLC entity, and a third MAC entity. The second device may include a fourth PDCP entity, a fourth RLC entity, and a fourth MAC entity. Specifically, the PDCP entity of the communication device reaches the third MAC entity, the third RLC entity, and the third PDCP entity of the first device through the first RLC entity, the first MAC entity, and then the air interface. The PDCP entity of the communication device also reaches the fourth MAC entity, the fourth RLC entity, and the fourth PDCP entity of the second device through the second RLC entity, the second MAC entity, and then the air interface.

The protocol architecture of the embodiment of the present application is described above with reference to FIGS. 4 and 5, and the wireless communication method according to embodiments of the present application is described below with reference to FIG. 6. It should be understood that the method 200 shown in FIG. 6 may be executed by the communication device shown in FIG. 5, which includes at least two PDCP entities.

As shown in FIG. 6, the method 200 may include:

210, serving the same upper-layer data through at least two PDCP entities.

In the embodiments of the present application, the communication device serves the same upper-layer data through at least two PDCP entities, so as to avoid service interruption of the PDCP entity, thereby improving data transmission efficiency.

More specifically, the at least two PDCP entities pass through different RLC layers and MAC layers, and reach corresponding MAC layers, RLC layers, and PDCPs of at least two target ends through the air interface, so that each of the at least two target ends submits the generated data (PDCP SDU) to the upper layer.

Optionally, the upper-layer data includes data in one or more Quality of Service (QoS) flows.

Optionally, the upper-layer data includes data in one or more evolved packet system (EPS) bearers.

Optionally, each of the at least two PDCP entities has a respective key.

Optionally, a PDCP entity of the at least two PDCP entities has a data duplication function. Specifically, the PDCP entity of the at least two PDCP entities is used for generating a PDCP PDU and duplicate data of the PDCP PDU.

Optionally, a PDCP entity of the at least two PDCP entities has a redundancy detection function. Specifically, the PDCP entity of the at least two PDCP entities is configured to receive a data unit sent by an RLC entity or a SDAP entity, and perform redundancy detection on the received data unit.

Optionally, the at least two PDCP entities correspond to at least one SDAP entity.

Optionally, the at least one SDAP entity and the at least two PDCP entities are in one-to-one correspondence.

Optionally, the at least one SDAP entity includes only one SDAP entity.

Optionally, a SDAP entity in the at least one SDAP entity has a data duplication function. Specifically, the SDAP entity in the at least one SDAP entity is configured to generate a SDAP PDU and duplicated data of the SDAP PDU. Further, in some embodiments of the application, the SDAP PDU and the duplicated data of the SDAP PDU generated by the SDAP entity in the at least one SDAP entity each include a sequence number (SN) of the SDAP PDU.

Optionally, the SDAP entity in the at least one SDAP entity has a redundancy detection function. Specifically, the SDAP entity in the at least one SDAP entity is configured to receive PDCP PDUs sent by the at least two PDCP entities, and perform redundancy detection on the PDCP PDUs sent by the at least two PDCP entities through the SDAP entity in the at least one SDAP entity. Further, in some embodiments of the present application, the SDAP PDU generated by the SDAP entity in the at least one SDAP entity includes a serial number (SN) of the SDAP PDU.

Optionally, any one of the at least two PDCP entities includes a sending entity and a receiving entity.

Optionally, the at least two PDCP receiving entities each independently perform encryption and/or decryption functions.

Optionally, the at least two PDCP receiving entities each independently perform compression and/or decompression functions.

Optionally, the at least two PDCP sending entities each independently perform an encryption function.

Optionally, the at least two PDCP sending entities each independently perform a compression function.

Optionally, the PDCP entity in the at least two PDCP entities performs redundancy detection according to a sequence number SN and/or a hyper frame number HFN and/or a count value of a PDCP PDU.

Optionally, the redundancy detection is performed after the decryption is completed.

Optionally, the redundancy detection is performed after the decompression is completed.

Optionally, the PDCP entity in the at least two PDCP entities perform reordering according to a sequence number SN and/or a hyper frame number HFN and/or a count value of a PDCP PDU.

Optionally, the reordering is performed after the decryption is completed.

Optionally, the reordering is performed after the decompression is completed.

Optionally, the communication device forwards the data processed by the PDCP to the first device.

Optionally, the first PDCP entity and the second PDCP entity are configured on an RLC entity in a UM mode.

Optionally, the first PDCP entity and the second PDCP entity are configured on a signaling bearer SRB.

Optionally, the PDCP processing includes decryption.

Optionally, the PDCP processing includes decompression.

Optionally, the PDCP processing includes data duplication.

Optionally, the communication device is a source end in a handover process, and the first device is a target end in the handover process.

Optionally, the second device is a source end in a handover process, and the first device is a target end in the handover process.

Optionally, the communication device is a target end in a handover process, and the first device is a source end in the handover process.

Optionally, the second device is the target end in a handover process, and the first device is a source end in the handover process.

Optionally, the first device has functions of redundancy detection and reordering.

Optionally, the first device performs compression and/or encryption processing on the forwarded data.

Optionally, the communication device forwards the data processed by PDCP to the first device together with at least one of the following:

sequence number SN, hyper frame number HFN and count value of PDCP PDU.

Optionally, the at least one network device includes a first device and a second device, and the first device forwards at least one of the following to the second device:

sequence number SN, hyper frame number HFN and count value of PDCP PDU.

Optionally, the sequence number SN, hyper frame number HFN, and count value of PDCP PDU are respectively the sequence number SN, hyper frame number HFN, and count value COUNT of PDCP PDU that the first device has transmitted.

Optionally, the sequence number SN, hyper frame number HFN, and count value of PDCP PDU are respectively the maximum sequence number SN, the maximum hyper frame number HFN, and the maximum count value COUNT of PDCP PDU that the first device has received.

Optionally, the second device forwards the data processed by PDCP to the first device together with at least one of the following:

sequence number SN, hyper frame number HFN and count value of PDCP PDU.

Optionally, the sequence number SN, hyper frame number HFN, and count value of PDCP PDU are respectively the sequence number SN, hyper frame number HFN, and count value COUNT of PDCP PDU that the second device has sent.

Optionally, the sequence number SN, hyper frame number HFN, and count value of PDCP PDU are respectively the maximum sequence number SN, the maximum hyper frame number HFN, and the maximum count value COUNT of PDCP PDU that the second device has received.

Optionally, when a specific condition is satisfied, the communication device forwards the data processed by the PDCP to the first device.

Optionally, the specific condition includes:

the communication device received or has received radio resource control RRC connection completion information.

Optionally, the at least two PDCP entities are a first PDCP entity and a second PDCP entity.

Optionally, the first PDCP entity and the second PDCP entity are established at the same time.

Optionally, the second PDCP entity has been established, and the first PDCP entity is established according to the second PDCP entity.

Optionally, the first PDCP entity is a first PDCP receiving entity, the second PDCP entity is a second PDCP receiving entity, and the first PDCP receiving entity is established according to the second PDCP receiving entity.

Optionally, the first PDCP receiving entity performs variables initialization according to a sequence number SN and/or a hyper frame number HFN and/or a count value of at least one of the following data units of the second PDCP receiving entity:

a first missing PDCP service data unit (SDU), a next PDCP SDU to be received, a first PDCP SDU indicative of waiting to be delivered to an upper layer, or a PDCP protocol data unit (PDU) used for triggering a reordering timer.

Optionally, the first PDCP receiving entity performs variables initialization according to a sequence number SN and/or a hyper frame number HFN and/or a count value of an out-of-order data packet that the second PDCP receiving entity has received.

Optionally, the first PDCP entity and the second PDCP entity are configured on an RLC entity in a UM mode.

Optionally, the first PDCP entity and the second PDCP entity are configured on a signaling bearer SRB.

Optionally, the first PDCP entity is a first PDCP sending entity, the second PDCP entity is a second PDCP sending entity, and the first PDCP sending entity is established according to the second PDCP sending entity.

Optionally, the first PDCP sending entity performs variables initialization based on a sequence number SN and/or a hyper frame number HFN and/or a count value of a next PDCP PDU to be allocated by the second PDCP sending entity, or a maximum SN and/or a maximum HFN and/or a maximum count value of a PDCP PDU that has been sent by the second PDCP sending entity.

Optionally, the second PDCP entity is established through network configuration.

Optionally, the network configuration includes at least one of the following:

whether to configure a data duplication function, whether to activate the data duplication function, and whether to send data using the first PDCP entity or the second PDCP entity.

Optionally, the method shown in FIG. 6 may further include:

220: exchanging sending condition of a PDCP PDU between sending entities of the at least two PDCP entities.

Optionally, the sending condition of the PDCP PDU includes a sequence number SN and/or a hyper frame number HFN and/or a count value COUNT of the PDCP PDU that has been sent.

Optionally, the sending condition of the PDCP PDU further includes a maximum SN and/or a maximum HFN and/or a maximum count value COUNT of the PDCP PDU that has been sent.

Optionally, the method shown in FIG. 6 may further include:

230, exchanging receiving condition of a PDCP PDU between receiving entities of the at least two PDCP entities.

Optionally, the receiving condition of the PDCP PDU includes a serial number SN and/or a hyper frame number HFN and/or a count value COUNT of the received PDCP PDU.

Optionally, the receiving condition of the PDCP PDU includes a data forwarding condition of the decrypted data packet.

Optionally, the receiving condition of the PDCP PDU further includes a count value indicative of a next PDCP SDU to be received, a count value indicative of a first PDCP SDU waiting to be delivered to an upper layer, or a count value of a PDCP PDU used for triggering a reordering timer increased by one.

In other words, the receiving condition of the PDCP PDU may include a first state variable RX_NEXT, which indicates the count value of the next PDCP SDU expected to be received. The receiving condition of the PDCP PDU may also include a second state variable RX_DELIV, which indicates the count value of the first PDCP SDU not yet but still waited for being delivered to the upper layers. The receiving condition of the PDCP PDU may also include a third state variable RX_REORD, which indicates the COUNT value following the COUNT value associated with the PDCP Data PDU which triggered t-Reordering.

Optionally, initial values of the first state variable RX_NEXT, the second state variable RX_DELIV, and the third state variable RX_REORD are set to zero.

Optionally, the at least two PDCP entities are located at the network device side.

Optionally, the at least two PDCP entities serve the first terminal device at the same time, and the first terminal device uses the first PDCP entity to communicate with the at least two PDCP entities.

Optionally, the first PDCP entity uses a set of variables to handle communications with the at least two PDCP entities.

Optionally, the first PDCP entity uses at least two sets of variables to separately process communications with the at least two PDCP entities.

Optionally, the variable includes at least one of the following:

a count value of a next PDCP SDU to be transmitted, a count value of a next PDCP SDU expected to receive, a count value of a first PDCP SDU that has not been delivered to an upper layer but is still waiting to be transmitted, a count value of a PDCP PDU used for triggering a reordering timer, a PDCP SN of a next PDCP SDU to be transmitted, a HFN of the next PDCP PDU to be transmitted, a next PDCP SN expected to be received, a HFN of a next PDCP PDU expected to be received, a SN of a last PDCP SDU that has been delivered to the upper layer, or a count value of a last PDCP SDU that has been delivered to the upper layer.

Optionally, the first PDCP entity of the first terminal device is established through network configuration.

Optionally, the network configuration includes at least one of the following:

whether to configure a data duplication function, whether to activate the data duplication function, and using the first PDCP entity to send data to one of at least one associated RLC entity.

Optionally, the first terminal device using the first PDCP entity to communicate with the at least two PDCP entities includes: the first PDCP entity performs data duplication processing before encryption processing.

Optionally, the first terminal device using the first PDCP entity to communicate with the at least two PDCP entities includes: the first PDCP entity performs data duplication processing before compression processing.

Figure 7:
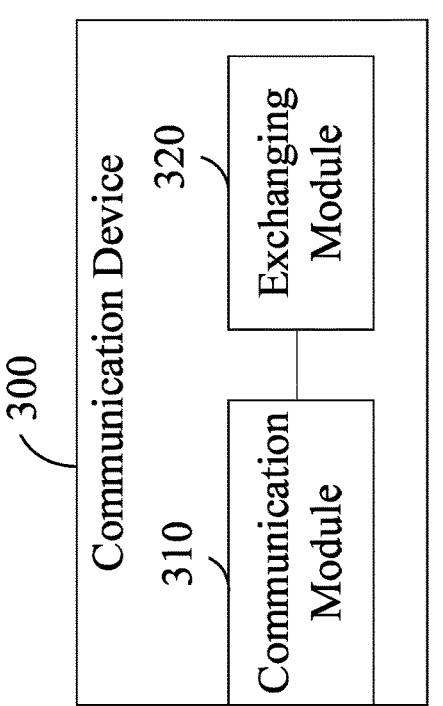
FIG. 7 is a block diagram illustrating a communication device according to an embodiment of the present application.

FIG. 7 is a schematic block diagram illustrating a communication device 300 according to an embodiment of the present application. It should be understood that the communication device 300 has at least two packet data convergence protocol PDCP entities, and the at least two PDCP entities are configured to serve the same upper-layer data.

As shown in FIG. 7, the communication device 300 may include:

a communication module 310 configured to receive data and/or send data through the at least two PDCP entities.

Optionally, the upper-layer data includes data in one or more quality of service QoS flows.

Optionally, the upper-layer data includes data in one or more Evolved Packet System EPS bearers.

Optionally, each of the at least two PDCP entities has a respective key.

Optionally, a PDCP entity of the at least two PDCP entities has a data duplication function.

Optionally, a PDCP entity of the at least two PDCP entities has a redundancy detection function.

Optionally, the communication device further has at least one service data adaptation protocol SDAP entity; the communication module 310 is specifically configured to:

receive data and/or send data through the at least two PDCP entities and at least one SDAP entity corresponding to the at least two PDCP entities.

Optionally, the SDAP entity in the at least one SDAP entity has a data duplication function.

Optionally, the SDAP entity in the at least one SDAP entity has a redundancy detection function.

Optionally, a SDAP PDU generated by the SDAP entity in the at least one SDAP entity includes a serial number SN of the SDAP PDU.

Optionally, the at least one SDAP entity and the at least two PDCP entities are in one-to-one correspondence.

Optionally, the at least one SDAP entity includes only one SDAP entity.

Optionally, any one of the at least two PDCP entities includes a sending entity and a receiving entity.

Optionally, the at least two PDCP receiving entities each independently perform encryption and/or decryption functions.

Optionally, the at least two PDCP receiving entities each independently perform a compression and/or decompression function.

Optionally, the at least two PDCP sending entities each independently perform an encryption function.

Optionally, the at least two PDCP sending entities each independently perform a compression function.

Optionally, the PDCP entity in the at least two PDCP entities performs redundancy detection according to a sequence number SN and/or a hyper frame number HFN and/or a count value of a PDCP protocol data unit PDU.

Optionally, the redundancy detection is performed after the decryption is completed.

Optionally, the redundancy detection is performed after the decompression is completed.

Optionally, the PDCP entity in the at least two PDCP entities performs reordering according to a sequence number SN and/or a hyper frame number HFN and/or a count value of a PDCP protocol data unit PDU.

Optionally, the reordering is performed after the decryption is completed.

Optionally, the reordering is performed after the decompression is completed.

Optionally, the communication module 310 is further configured to:

forward the data processed by PDCP to the first device.

Optionally, the communication device includes at least one network device, and one network device corresponds to one PDCP entity.

Optionally, the at least one network device includes a first device and a second device, and the communication module of the second device is configured to:

forward the processed data to the first device.

Optionally, the PDCP processing includes decryption.

Optionally, the PDCP processing includes decompression.

Optionally, the PDCP processing includes data duplication.

Optionally, the communication device is a source end in a handover process, and the first device is a target end in the handover process.

Optionally, the second device is a source end in a handover process, and the first device is a target end in the handover process.

Optionally, the communication device is a target end in a handover process, and the first device is a source end in the handover process.

Optionally, the second device is the target end in a handover process, and the first device is the source end in the handover process.

Optionally, the first device has functions of redundancy detection and reordering.

Optionally, the first device performs compression and/or encryption processing on the forwarded data.

Optionally, the communication module 310 is specifically configured to:

forward the data processed by PDCP to the first device together with at least one of the following:

PDCP PDU sequence number SN, hyper frame number HFN and count value.

Optionally, the at least one network device includes a first device and a second device, and the communication module of the first device is specifically configured to:

forward at least one of the following to the second device:

PDCP PDU sequence number SN, hyper frame number HFN and count value.

Optionally, the PDCP PDU sequence number SN, hyper frame number HFN, and count value are respectively the PDCP PDU sequence number SN, hyper frame number HFN, and count value COUNT that the first device has transmitted.

Optionally, the sequence number SN, the hyper frame number HFN, and the count value of the PDCP PDU are the maximum sequence number SN, the maximum hyper frame number HFN, and the maximum count value COUNT of the PDCP PDU that the first device has received.

Optionally, the communication module of the second device is specifically configured to:

forward the data processed by PDCP to the first device together with at least one of the following:

PDCP PDU sequence number SN, hyper frame number HFN and count value.

Optionally, the PDCP PDU sequence number SN, hyper frame number HFN, and count value are the PDCP PDU sequence number SN, hyper frame number HFN, and count value COUNT that the second device has sent, respectively.

Optionally, the sequence number SN, the hyper frame number HFN, and the count value of the PDCP PDU are the maximum sequence number SN, the maximum hyper frame number HFN, and the maximum count value COUNT of the PDCP PDU that the second device has received.

Optionally, the communication module 310 is specifically configured to:

when a specific condition is met, the communication device forwards the data processed by the PDCP to the first device.

Optionally, the specific condition includes:

the communication device receives or has received radio resource control RRC connection completion information.

Optionally, the at least two PDCP entities are a first PDCP entity and a second PDCP entity.

Optionally, the first PDCP entity and the second PDCP entity are established at the same time.

Optionally, the second PDCP entity has been established, and the first PDCP entity is established according to the second PDCP entity.

Optionally, the first PDCP entity is a first PDCP receiving entity, the second PDCP entity is a second PDCP receiving entity, and the first PDCP receiving entity is established according to the second PDCP receiving entity.

Optionally, the first PDCP receiving entity performs variables initialization according to a sequence number SN and/or a hyper frame number HFN and/or a count value of at least one of the following data units of the second PDCP receiving entity:

a first missing PDCP service data unit (SDU), a next PDCP SDU to be received, a first PDCP SDU indicative of waiting to be delivered to an upper layer, or a PDCP protocol data unit (PDU) used for triggering a reordering timer.

Optionally, the first PDCP receiving entity performs variables initialization according to a sequence number SN and/or a hyper frame number HFN and/or a count value of the out-of-order data packet that the second PDCP receiving entity has received.

Optionally, the first PDCP entity and the second PDCP entity are configured on an RLC entity in a UM mode.

Optionally, the first PDCP entity and the second PDCP entity are configured on a signaling bearer SRB.

Optionally, the first PDCP entity is a first PDCP sending entity, the second PDCP entity is a second PDCP sending entity, and the first PDCP sending entity is established according to the second PDCP sending entity.

Optionally, the first PDCP sending entity performs variables initialization based on a sequence number (SN) and/or a hyper frame number (HFN) and/or a count value of a next PDCP PDU to be allocated by the second PDCP sending entity, or a maximum SN and/or a maximum HFN and/or a maximum count value of a PDCP PDU that has been sent by the second PDCP sending entity.

Optionally, the second PDCP entity is established through network configuration.

Optionally, the network configuration includes at least one of the following:

whether to configure a data duplication function, whether to activate the data duplication function, and whether to send data using the first PDCP entity or the second PDCP entity.

Optionally, the communication device further includes:

an exchanging module 320, configured to exchange sending condition of a PDCP PDU between the sending entities of the at least two PDCP entities.

Optionally, the sending condition of a PDCP PDU includes a sequence number SN and/or a hyper frame number HFN and/or a count value COUNT of the PDCP PDU that has been sent.

Optionally, the sending condition of the PDCP PDU further includes a maximum SN and/or a maximum HFN and/or a maximum count value COUNT of the PDCP PDU that has been sent.

Optionally, the communication device further includes:

an exchanging module 320, configured to exchange receiving condition of a PDCP PDU between the receiving entities of the at least two PDCP entities.

Optionally, the receiving condition of the PDCP PDU includes a serial number SN and/or a hyper frame number HFN and/or a count value COUNT of the received PDCP PDU.

The receiving condition of the PDCP PDU includes the data forwarding condition of a decrypted data packet.

Optionally, the receiving condition of the PDCP PDU further includes a count value indicative of a next PDCP SDU to be received, a count value indicative of a first PDCP SDU waiting to be delivered to an upper layer, or a count value of a PDCP PDU used for triggering a reordering timer increased by one.

Optionally, the at least two PDCP entities are located at a network device side.

Optionally, the at least two PDCP entities serve the first terminal device at the same time, and the first terminal device uses the first PDCP entity to communicate with the at least two PDCP entities.

Optionally, the first PDCP entity uses a set of variables to handle communications with the at least two PDCP entities.

Optionally, the first PDCP entity uses at least two sets of variables to separately process communications with the at least two PDCP entities.

Optionally, the variables include at least one of the following:

a count value of a next PDCP SDU to be transmitted, a count value of a next PDCP SDU expected to receive, a count value of a first PDCP SDU that has not been delivered to an upper layer but is still waiting to be transmitted, a count value of a PDCP PDU used for triggering a reordering timer, a PDCP SN of a next PDCP SDU to be transmitted, a HFN of the next PDCP PDU to be transmitted, a next PDCP SN expected to be received, a HFN of a next PDCP PDU expected to be received, a SN of a last PDCP SDU that has been delivered to the upper layer, or a count value of a last PDCP SDU that has been delivered to the upper layer.

Optionally, the first PDCP entity of the first terminal device is established through network configuration.

Optionally, the network configuration includes at least one of the following:

whether to configure a data duplication function, whether to activate the data duplication function, and using the first PDCP entity to send data to one of at least one associated RLC entity.

Optionally, the first terminal device using the first PDCP entity to communicate with the at least two PDCP entities includes: the first PDCP entity performs data duplication processing before encryption processing.

Optionally, the first terminal device using the first PDCP entity to communicate with the at least two PDCP entities includes: the first PDCP entity performs data duplication processing before compression processing.

It should be understood that the device embodiment and the method embodiment may correspond to each other, and similar descriptions may refer to the method embodiment. Specifically, the communication device 400 shown in FIG. 7 may correspond to a corresponding subject in performing the method 200 in the embodiment of the present application, and the foregoing and other operations and/or functions of each unit in the communication device 400 are implemented in order to implement FIG. 6. For the sake of brevity, the corresponding processes in each method are not repeated here.

The communication device according to the embodiment of the present application is described above with reference to FIG. 7 from the perspective of a functional module. It should be understood that the functional module may be implemented by hardware, or by instructions in software, or by a combination of hardware and software modules.

Specifically, each step of the method embodiments in the embodiments of the present application may be completed by hardware integrated logic circuits and/or software instructions in the processor, and the steps of the method disclosed in the embodiments of the present application may be directly embodied as hardware. The execution of the decoding processor is completed, or a combination of hardware and software modules in the decoding processor is used for execution.

Optionally, the software module may be located in a well-known storage medium in the field such as a random access memory, a flash memory, a read-only memory, a programmable read-only memory, an electrically erasable programmable memory, a register, and the like. The storage medium is located in a memory, and the processor reads the information in the memory and completes the steps in the foregoing method embodiment in combination with its hardware. For example, in the embodiment of the present application, the communication module 310 shown in FIG. 7 may be implemented by a processor, and the exchanging module 320 shown in FIG. 7 may be implemented by a transceiver.

Figure 8:
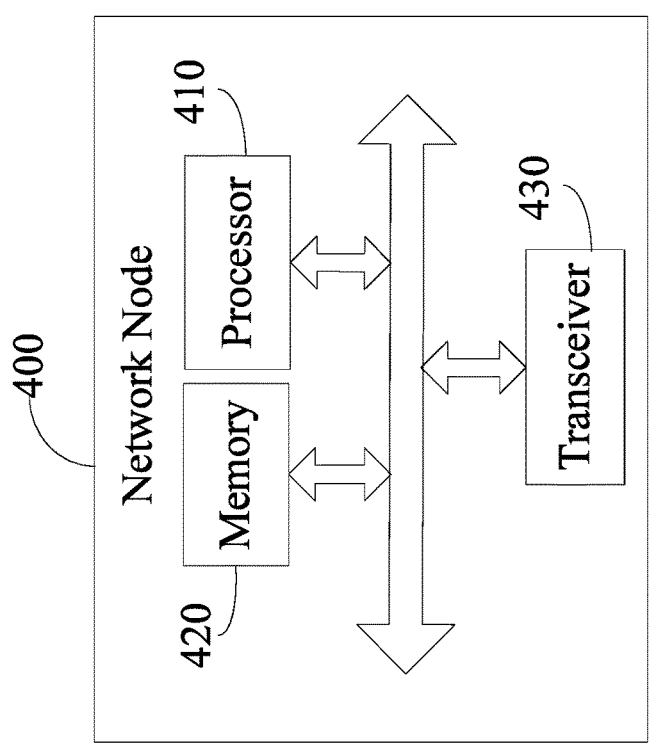
FIG. 8 is a block diagram illustrating a communication device according to another embodiment of the present application.

FIG. 8 is a schematic block diagram illustrating a communication device 400 according to an embodiment of the present application. The communication device 400 shown in FIG. 8 includes a processor 410, which can call and run a computer program from a memory to implement the method in the embodiments of the present application.

Optionally, as shown in FIG. 8, the communication device 400 may further include a memory 420. The memory 420 may be configured to store instruction information, and may also be configured to store code, instructions, and the like executed by the processor 410. The processor 410 may call and run a computer program from the memory 420 to implement the method in the embodiments of the present application.

The memory 420 may be a separate device independent of the processor 410, or may be integrated in the processor 410.

Optionally, as shown in FIG. 8, the communication device 400 may further include a transceiver 430, and the processor 410 may control the transceiver 430 to communicate with other devices. Specifically, it may send information or data to other devices, or receive other information, data sent by the device. The transceiver 430 may include a transmitter and a receiver. The transceiver 430 may further include antennas, and the number of antennas may be one or more.

Optionally, the communication device 400 may be a first node in the embodiment of the present application, and the communication device 400 may implement a corresponding process implemented by the first node in each method in the embodiments of the present application. That is, the communication device 400 in the embodiment of the present application may correspond to the communication device 400 in the embodiment of the present application, and may correspond to the corresponding subjects in the method 200 and the method 300 according to the embodiments of the present application, which will not be repeated here.

It should be understood that various components in the communication device 400 are connected through a bus system, where the bus system includes a power bus, a control bus, and a status signal bus in addition to a data bus.

In addition, a chip is provided in the embodiments of the present application. The chip may be an integrated circuit chip with signal processing capabilities, and can implement or execute the methods, steps, and logic block diagrams disclosed in the embodiments of the present application.

Optionally, the chip can be applied to various communication devices, so that the communication device installed with the chip can execute the methods, steps and logic block diagrams disclosed in the embodiments of the present application.

Figure 9:
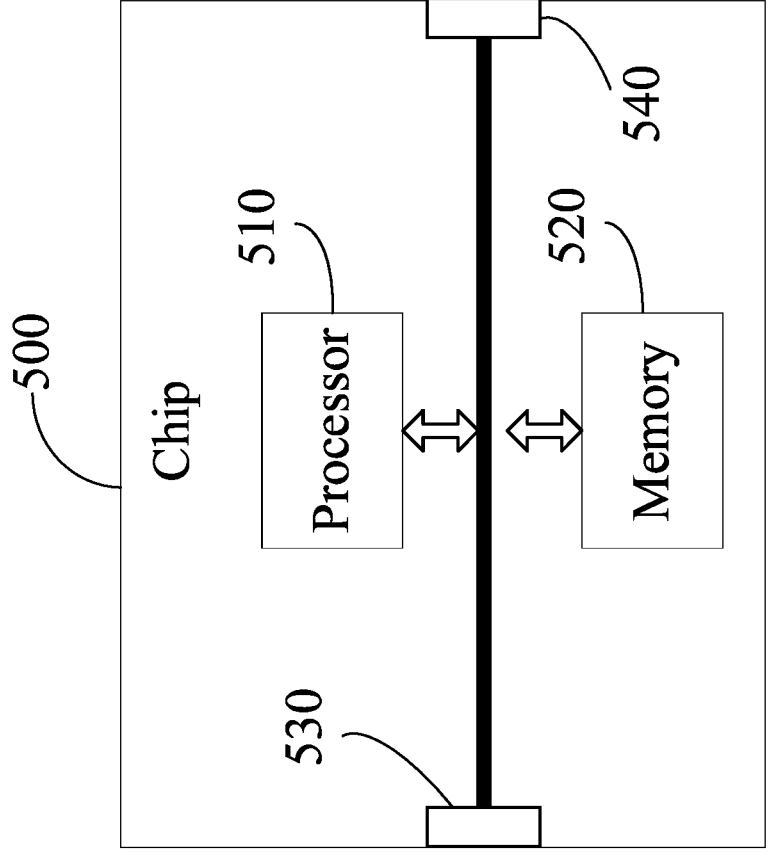
FIG. 9 is a block diagram illustrating a chip according to an embodiment of the present application.

FIG. 9 is a schematic block diagram illustrating a chip according to an embodiment of the present application. The chip 500 shown in FIG. 9 includes a processor 510, and the processor 510 can call and run a computer program from a memory to implement the method in the embodiments of the present application.

Optionally, as shown in FIG. 9, the chip 500 may further include a memory 520. The processor 510 may call and run a computer program from the memory 520 to implement the method in the embodiments of the present application. The memory 520 may be configured to store instruction information, and may also be configured to store code, instructions, and the like executed by the processor 510. The memory 520 may be a separate device independent of the processor 510, or may be integrated in the processor 510.

Optionally, the chip 500 may further include an input interface 530. The processor 510 may control the input interface 530 to communicate with other devices or chips. Specifically, the processor 510 may obtain information or data sent by other devices or chips. Optionally, the chip 500 may further include an output interface 540. The processor 510 may control the output interface 540 to communicate with other devices or chips. Specifically, the processor 510 may output information or data to the other devices or chips. Optionally, the chip can be applied to the communication device in the embodiments of the present application, and the chip can implement the corresponding process implemented by the communication device in the method 200 of the embodiment of the present application. For brevity, details are not described herein.

It should be understood that the chip mentioned in the embodiments of the present application may also be referred to as a system-level chip, a system chip, a chip system or a system-on-chip. It should also be understood that various components in the chip 500 are connected through a bus system, where the bus system includes a power bus, a control bus, and a status signal bus in addition to a data bus.

The processor mentioned in the embodiment of the present application may be a general-purpose processor, a digital signal processor (DSP), an application specific integrated circuit (ASIC), and a field programmable gate array (FPGA) or other programmable logic devices, transistor logic devices, discrete hardware components, or the like. In addition, the general-purpose processor may be a microprocessor or the processor may be any conventional processor or the like.

In addition, the memory mentioned in the embodiments of the present application may be a volatile memory or a non-volatile memory, or may include both volatile and non-volatile memory. Among them, the non-volatile memory may be read-only memory (ROM), programmable read-only memory (PROM), erasable programmable read-only memory (erasable PROM, EPROM), electrical memory erasable programmable read-only memory (EPROM, EEPROM) or flash memory. The volatile memory may be a random access memory (RAM), which is used as an external cache.

It should be understood that the foregoing memory is exemplary but not restrictive. For example, the memory in the embodiments of the present application may also be a static random access memory (static RAM, SRAM), a dynamic random access memory (dynamic RAM, DRAM), synchronous dynamic random access memory (SDRAM), double data rate synchronous dynamic random access memory (Double SDRAM, DDR SDRAM), enhanced synchronous dynamic random access memory (enhanced SDRAM, ESDRAM), synchronous connection Dynamic random access memory (synch link DRAM, SLDRAM), direct memory bus random access memory (Direct Rambus RAM, DR RAM) and so on.

A computer-readable storage medium is also provided in the embodiments of the present application for storing a computer program.

Optionally, the computer-readable storage medium may be applied to the network device in the embodiment of the present application, and the computer program causes the computer to execute the corresponding process implemented by the network device in each method in the embodiments of the present application. For the sake of brevity, details will not be repeated here. Optionally, the computer-readable storage medium may be applied to the mobile terminal/terminal device in the embodiments of the present application, and the computer program causes the computer to execute a corresponding process implemented by the mobile terminal/terminal device in each method in the embodiments of the present application. For the sake of brevity, details will not be repeated here.

A computer program product is also provided in the embodiments of the present application, including computer program instructions.

Optionally, the computer program product can be applied to the network device in the embodiments of the present application, and the computer program instruction causes the computer to execute a corresponding process implemented by the network device in each method in the embodiments of the present application. For the sake of brevity, details will not be repeated here.

Optionally, the computer program product can be applied to a mobile terminal/terminal device in the embodiments of the present application, and the computer program instructions cause the computer to execute a corresponding process implemented by the mobile terminal/terminal device in each method in the embodiments of the present application. For the sake of brevity, details will not be repeated here.

A computer program is also provided in the embodiments of the present application. Optionally, the computer program may be applied to a network device in the embodiments of the present application. When the computer program is run on a computer, the computer is caused to execute a corresponding process implemented by the network device in each method in the embodiments of the present application. For the sake of brevity, details will not be repeated here.

An embodiment of the present application further provides a communication system. The communication system may include a communication device as shown in FIG. 5, and may further include a first device and a second device as shown in FIG. 5.

It should be noted that the terms "system" and the like in this document may also be referred to as "network management architecture" or "network system" and the like.

It should also be understood that the terminology used in the embodiments of the application and the appended claims is for the purpose of describing particular embodiments only and is not intended to limit the embodiments of the application.

For example, the singular forms "a", "the", "the above", and "the" used in the examples of the present application and the appended claims are also intended to include the plural forms unless the context clearly indicates otherwise meaning.

Those skilled in the art may realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation should not be considered to be beyond the scope of the embodiments of the present application.

If it is implemented in the form of a software functional unit and sold or used as an independent product, it can be stored in a computer-readable storage medium. Based on such an understanding, the technical solution of the embodiments of the present application is essentially a part that contributes to the existing technology or a part of the technical solution may be embodied in the form of a software product, which is stored in a storage medium and includes a plurality of instructions for causing a computer device (which may be a personal computer, a server, a network device, or the like) to perform all or part of the steps of the method described in the embodiments of the present application. The foregoing storage medium includes various medium that can store program codes, such as a U disk, a mobile hard disk, a read-only memory, a random access memory, a magnetic disk, or an optical disk.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the division of units or modules or components in the device embodiments described above is only a logical function division. In actual implementation, there may be another division manner. For example, multiple units or modules or components may be combined or integrated to another system, or some units or modules or components can be ignored or not implemented.

As another example, the above-mentioned units/modules/components described as separate/display components may be or may not be physically separated, that is, they may be located in one place, or may be distributed on multiple network units. Some or all of the units/modules/components can be selected according to actual needs to achieve the objectives of the embodiments of the present application.

Finally, it should be noted that the mutual coupling or direct coupling or communication connection shown or discussed above may be indirect coupling or communication connection through some interfaces, devices or units, which may be electrical, mechanical or other forms.

The above content is only a specific implementation of the embodiments of the present application, without limiting the protection scope of the embodiments of the present application. Any modification or replacement conceived by those skilled in the art within the technical scope disclosed in the embodiments of the present application should be covered within the protection scope of the embodiments of the present application. Therefore, the protection scope of the embodiments of the present application shall be subject to the protection scope of the claims.

What is claimed is:

1. A wireless communication method, applied to a communication device configured with at least two packet data convergence protocol (PDCP) entities, wherein the communication device comprises at least one network device corresponding to each PDCP entity one by one and the at least one network device comprises a first device and a second device, the at least two PDCP entities providing service for same upper-layer data, and the method comprising:

performing, by the communication device, transmission of data through the at least two PDCP entities;

forwarding, by the second device, processed data to the first device during a handover process, the forwarding further comprising: forwarding, by the second device, PDCP-processed data processed by the second device to the first device together with-a sequence number (SN), wherein the SN is a maximum SN of a PDCP PDU that has been received by the second device; and exchanging, by the communication device, sending status of a PDCP PDU between sending entities of the at least two PDCP entities, wherein the sending status of the PDCP PDU comprises a count value of the PDCP PDU that has been sent;

wherein the second device is a source end in the handover process, and the first device is a target end in the handover process, wherein the communication device is further configured with one service data adaptation protocol (SDAP) entity;

wherein the performing, by the communication device, transmission of data through the at least two PDCP entities further comprises:

performing, by the communication device, transmission of data through the at least two PDCP entities and the SDAP entity corresponding to the at least two PDCP entities, wherein the SDAP entity is provided with a redundancy detection function and a SDAP PDU generated by the SDAP entity comprises a sequence number (SN) of the SDAP PDU.

2. The method according to claim 1, wherein the at least two PDCP entities are located at a network device side.

3. The method according to claim 2, wherein the at least two PDCP entities are all configured to serve a first terminal device, and the first terminal device is configured to communicate with the at least two PDCP entities through a first PDCP entity.

4. The method according to claim 3, wherein the first PDCP entity of the first terminal device is established through a network configuration.

5. A communication device, configured with at least two packet data convergence protocol (PDCP) entities, wherein the communication device comprises at least one network device corresponding to each PDCP entity one by one and the at least one network device comprises a first device and a second device, the at least two PDCP entities providing service for same upper-layer data, and the communication device comprising:

a memory, configured to store a computer program;

a processor, configured to control a transceiver to communicate with at least another device; and the transceiver, configured to perform transmission of data through the at least two PDCP entities;

wherein the second device is configured to forward processed data to the first device during a handover process, the forwarding further comprising forwarding PDCP-processed data processed by the second device to the first device together with a sequence number (SN), wherein the SN is a maximum SN of a PDCP PDU that has been received by the second device;

wherein the transceiver is further configured to:

exchange sending status of a PDCP PDU between sending entities of the at least two PDCP entities, wherein the sending status of the PDCP PDU comprises a count value of the PDCP PDU that has been sent;

wherein the second device is a source end in the handover process, and the first device is a target end in the handover process, wherein the communication device is further configured with one service data adaptation protocol (SDAP) entity:

wherein, the transceiver is further configured to perform transmission of data through the at least two PDCP entities and the SDAP entity corresponding to the at least two PDCP entities, wherein the SDAP entity is provided with a redundancy detection function and a SDAP PDU generated by the SDAP entity comprises a sequence number (SN) of the SDAP PDU.

6. The communication device according to claim 5, wherein the at least two PDCP entities are located at a network device side.

7. The communication device according to claim 6, wherein the at least two PDCP entities are all configured to serve a first terminal device, and the first terminal device is configured to communicate with the at least two PDCP entities through a first PDCP entity.

8. A non-transitory storage medium, being used for storing a computer program, wherein the computer program comprises instructions used for causing a communication device to implement a wireless communication method, wherein the communication device is configured with at least two packet data convergence protocol (PDCP) entities, wherein the communication device comprises at least one network device corresponding to each PDCP entity one by one and the at least one network device comprises a first device and a second device, the at least two PDCP entities provide service for same upper-layer data, and the method comprises:

performing, by the communication device, transmission of data through the at least two PDCP entities;

forwarding, by the second device, processed data to the first device during a handover process, the forwarding further comprising: forwarding, by the second device, PDCP-processed data processed by the second device to the first device together with a sequence number (SN), wherein the SN is a maximum SN of a PDCP PDU that has been received by the second device; and exchanging, by the communication device, sending status of a PDCP PDU between sending entities of the at least two PDCP entities, wherein the sending status of the PDCP PDU comprises a count value of the PDCP PDU that has been sent;

wherein the second device is a source end in the handover process, and the first device is a target end in the handover process, wherein the communication device is further configured with one service data adaptation protocol (SDAP) entity;

wherein the performing, by the communication device, transmission of data through the at least two PDCP entities comprises:

performing, by the communication device, transmission of data through the at least two PDCP entities and the SDAP entity corresponding to the at least two PDCP entities, wherein the SDAP entity is provided with a redundancy detection function and a SDAP PDU generated by the SDAP entity comprises a sequence number (SN) of the SDAP PDU.

\* \* \* \* \*